July 5, 1927.
R. KAUCH
GROUND SPEED INDICATOR
Filed Oct. 31, 1922
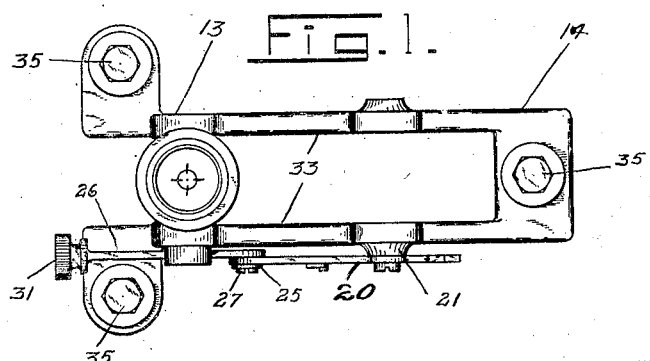
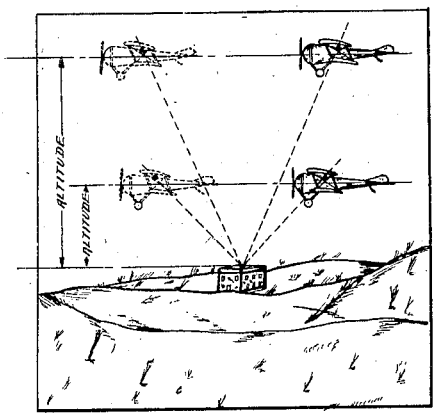
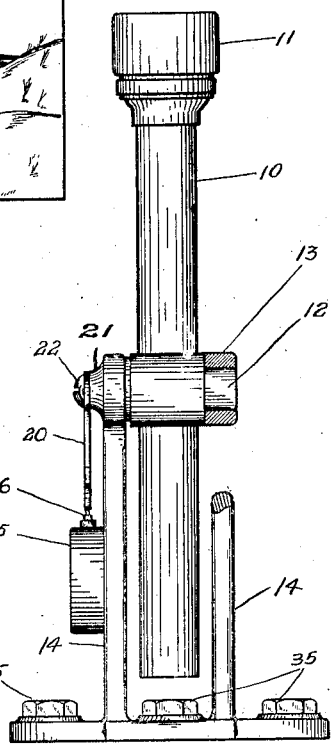
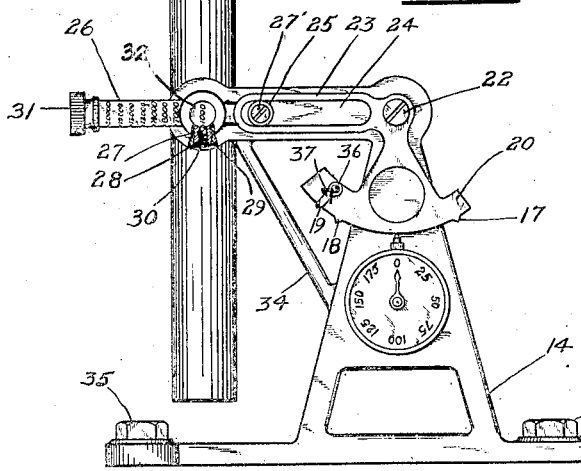
INVENTOR.
Robert Kauch
BY
Robert H. Young
ATTORNEYS.

Patented July 5, 1927.

1,635,045

UNITED STATES PATENT OFFICE.

ROBERT KAUCH, OF DAYTON, OHIO.

GROUND-SPEED INDICATOR.

Application filed October 31, 1922. Serial No. 598,154.

My invention relates to speed indicators and more particularly to an instrument of this type adapted to be used in ascertaining the speed of an aircraft with relation to the ground. The accurate determination of this relative speed is an important factor in timing the release of bombs and in the correct firing of aircraft guns.

In carrying my invention into practice a telescope is used which is moved at an angular velocity sufficient to keep an object in the line of sight. This movement of the telescope is communicated to means for starting and stopping a stop watch mechanism, the relation between the telescope and said means being adjustable to compensate for altitude, so that the distance traveled by the aircraft is the same although the angle through which the telescope moves may vary.
By thus maintaining constant the distance traveled by the aircraft between the starting and stopping of a stop watch mechanism, the ground speed may be directly, simply and accurately obtained.

Fig. 1 is a plan view of an apparatus embodying my invention.

Fig. 2 is a side elevation.

Fig. 3 is an end view with certain parts in section to show the construction of the fulcrum block of the telescope.

Fig. 4 is a diagrammatic view showing the principle of operation.

My invention will be described in its simplest form for use when flying either with or against the wind, or when there is no appreciable wind, although it will be understood that the drift due to side winds may be taken care of in a manner well known in the art.

A telescope or other sighting member 10 having an eyepiece 11 is provided with trunnions 12 which are rotatably mounted in bearings 13 of a pedestal 14. A stop watch mechanism 15 mounted on the pedestal has a plunger 16 projecting upwardly into the path of spaced lugs 17, 18, and a finger 19 carried by a sector 20. The sector forms one arm of a bell crank lever which is pivoted on a suitably machined surface of a boss 21 extending from the pedestal and is retained in position by a screw 22. The other arm 23 of the bell crank lever is formed with an elongated slot 24 in which a roller 25 is adjustably mounted.

The roller 25 is mounted near one end of an altitude adjustment rod 26 by means of a screw 27' which rotatably mounts the roller and which is threaded into said rod. One of the trunnions 12 extends beyond the corresponding bearing 13 and is formed with a transverse slot through which the adjustment rod 26 extends. One face of the rod 26 is graduated in terms of altitude and an edge thereof opposite these graduations is formed with V-shaped notches adapted to cooperate with a spring pressed latch 27 for releasably holding the rod in adjusted position. The spring 28 and latch 27 are mounted in a casing 29 attached to the extension of the trunnion. The body of the latch is shown in the form of a sleeve which embraces the spring, the latter bearing at one end against a detachable plug 30 and at the other end against the wedge shaped head of the latch. A milled head 31 attached to the outer end of the altitude adjustment rod permits easy manipulation thereof. In order that the graduation in alignment with the latch may be visible to the observer the outer end of the slotted trunnion of the telescope is made hollow as illustrated at 32.

The bearings 13 are preferably formed in spaced arms 33 which extend laterally from the main body of the pedestal 14 and are reinforced by the diagonal braces 34. The base of the pedestal is secured to an appropriate part of an aircraft by the fastening devices 35.

The altitude of the aircraft is determined by suitable means such as an aneroid barometer and the rod 26 is adjusted accordingly. The eye piece end of the telescope is normally in extreme right hand position with the finger 19 at the right of the plunger 16. The finger 19 is pivoted at 36 and yieldingly pressed by a spring 37 against a stop pin projecting from a sector 20. An object upon the ground is sighted through the telescope and this object is followed by a pivotal movement of the telescope. The altitude adjustment rod controls the position of the roller 25 in the slot 24 and thus regulates the relation between the angular movements of the telescope and the corresponding movements imparted to the sector 20. The pivotal movement of the telescope in following the object causes the finger 19 to be rotated by the plunger against the tension of spring 37, allowing the plunger of the stop watch mechanism to travel past it without depression. The cam lug 18 next comes into contact with the stop watch plunger, causing it to be depressed, thereby starting the stop watch. Further movement of the telescope causes cam lug 17 to come into contact with the plunger 16 which depresses the latter and stops the watch mechanism. The stop watch is constructed to give readings of the ground speed directly.

When the telescope is returned to its normal position, the lug 17 again contacts with the plunger thereby throwing the stop watch into action. Further movement brings the lug 18 against the plunger which stops the watch. Due to the peculiar construction of the stop watch mechanism, it is necessary to again depress the plunger in order to return the indicator hand thereof to zero. This is accomplished by the finger 19 which being in contact with its stop, is able on the return movement of the sector 20 to strike against and depress the plunger thereby returning the stop watch to a zero reading.

It will be noted that the length of the radius of the sector and the distance between the two axes 12 and 21 of the sight and slotted arm, respectively, are constant, and may be of any desired value. The effective length of the slotted arm at any particular adjustment and the length of the altitude adjustment rod 26 between the axis 12 and the end of the rod where it is attached to the slotted link may be made of any proper value dependent upon the assumed length of ground to be flown on in making the calibration. The altitude adjustment rod 26 is calibrated by properly positioning the notches for the respective altitudes so that the scale of the watch will show the proper speed for the particular assumed length of travel of the airplane. The calibrations of the altitude adjustment arm 26 are so positioned that the length of travel of the airplane between the starting and stopping of the watch is a constant.

In Fig. 4 it is diagrammatically shown that the distance over which the airplane travels between the starting and stopping of the watch mechanism is the same irrespective of altitude. Since the distance traveled by the aircraft is the same in all cases, it is apparent that the ground speed may be ascertained by dividing this distance by the time indicated on the stop watch mechanism. This mechanism, however is preferably constructed to read directly in miles per hour as indicated in Fig. 2. It will be noted that the telescope, when midway in the arc of its swing indicates that the aircraft has traveled half the desired distance. The telescope is shown in this midway position in Fig. 2 in order to demonstrate the fact that the mechanism always records through a right angle triangle of which two sides are known, namely one half of the prescribed distance and the altitude. Since correction is made for altitude and the time is known the ground speed can be readily ascertained, as described above.

What I claim is:

1. An apparatus of the class described, comprising a pivoted sighting member, a stop watch mechanism, a lever pivoted adjacent thereto and having means for starting and stopping said mechanism, and a link carried by said sighting member for movement therewith and having a pivoted sliding connection with said lever whereby a setting for altitude may be effected.

2. In an apparatus of the class described, in combination with a movable sighting member adapted to follow an object sighted, a stop watch mechanism, a lever pivoted adjacent to said mechanism and provided with means for starting and stopping said mechanism, and a link connected to said lever and to said member to inter-connect them for simultaneous movement, said link being adjustable manually to vary the speed of angular movement of said lever relative to the speed of angular movement of said sighting member.

3. In a speed measuring apparatus of the class described, in combination, a support, a sighting member pivotally mounted on said support, a rotatable part pivoted on said support, a manually adjustable connection between said member and said part to interconnect them together for pivotal movement at various relative speeds, a stop watch mechanism mounted on said support adjacent to said part, and means controlled by the movement of said part for starting and stopping the stop watch mechanism.

4. In a ground speed indicator, a pivoted sighting member, a stop watch mechanism, a bell crank lever interposed between said sighting member and said watch mechanism, one arm of said lever being provided with spaced lugs adapted to respectively start, stop and reset said mechanism, and a rod carried by said member and having a pivotal sliding connection with the other arm of said bell crank whereby said connection may be set for altitude.

5. A speed measuring apparatus for aircraft, comprising a support, a sighting member pivoted thereon on a horizontal axis and adapted to rotate while directed on the ground object, a stop watch mechanism, a rotatable part pivoted on said support having a radial slot therein, a link adjustably connected to both said member and said slot for interconnecting the member and the rotatable part for simultaneous pivotal movement at various relative angular velocities, and means on said rotatable part for starting and stopping said mechanism.

6. In a speed measuring apparatus for aircraft, a support, a sighting member pivoted thereon on a horizontal axis and adapted to rotate while directed on a ground object, a stop watch mechanism, a rotatable lever pivoted on said support having a radial slot therein, a link adjustably connected to both said member and said slot for interconnecting the member and the rotatable lever for simultaneous pivotal movement at various relative angular velocities, a projection on said rotatable lever for starting said mechanism after the sighting member has followed the object for some time, and a second projection on the rotatable lever for stopping said mechanism after a pre-determined distance has been traveled as the sighting member is maintained directed on the object.

In testimony whereof I affix my signature.

ROBERT KAUCH.